US012230134B2

(12) United States Patent
Pachal et al.

(10) Patent No.: US 12,230,134 B2
(45) Date of Patent: Feb. 18, 2025

(54) SYSTEMS AND METHODS FOR PUBLIC TRANSIT ARRIVAL TIME PREDICTION

(71) Applicant: Tata Consultancy Services Limited, Mumbai (IN)

(72) Inventors: Soumen Pachal, Chennai (IN); Nancy Bhutani, New Delhi (IN); Avinash Achar, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 124 days.

(21) Appl. No.: 18/066,392

(22) Filed: Dec. 15, 2022

(65) Prior Publication Data

US 2024/0029562 A1   Jan. 25, 2024

(30) Foreign Application Priority Data

Jul. 22, 2022   (IN) .............................. 202221042121

(51) Int. Cl.
*G08G 1/123* (2006.01)
*G01C 21/34* (2006.01)

(52) U.S. Cl.
CPC ......... *G08G 1/123* (2013.01); *G01C 21/3492* (2013.01)

(58) Field of Classification Search
CPC .... G08G 1/123; G08G 1/0112; G08G 1/0129; G08G 1/0133; G08G 1/0141;
(Continued)

(56) References Cited

U.S. PATENT DOCUMENTS

2013/0110392 A1* 5/2013 Kosseifi ............. G01C 21/3492
701/410

FOREIGN PATENT DOCUMENTS

CN   110717627 B  *  1/2022   ............. G06Q 10/04

OTHER PUBLICATIONS

Yang, Shuguan et al., "Understanding and predicting travel time with spatio-temporal features of network traffic flow, weather and incidents", Applications, Date: Oct. 2019, Publisher: Arxiv, https://arxiv.org/pdf/1901.06766.pdf.
Liu, Hongjie et al., "Bus Arrival Time Prediction Based on LSTM and Spatial-temporal Feature Vector", IEEE Access, Date: Jan. 2020, vol. 8, pp. 11917-11929, Publisher: IEEE, https://ieeexplore.ieee.org/stamp/stamp.jsp?arnumber=8954709.
Alam, Omar et al., "Predicting Irregularities in Arrival Times for Transit Buses with Recurrent Neural Networks Using GPS Coordinates and Weather Data", Journal of Ambient Intelligence and Humanized Computing, Date: Mar. 2020, vol. 12 (2), Publisher: Springer, https://www.researchgate.net/publication/343917790_Predicting_Irregularities_in_Arrival_Times_for_Transit_Buses_Recurrent_Neural_Networks_Using_GPS_Coordinates_and_Weather_Data/link/5f523b24299bf13a319ef36c/download.

(Continued)

*Primary Examiner* — James J Yang
*Assistant Examiner* — Anthony D Afrifa-Kyei
(74) *Attorney, Agent, or Firm* — Finnegan, Henderson, Farabow, Garrett & Dunner, LLP

(57) ABSTRACT

Arrival/Travel times for public transit exhibit variability on account of factors like seasonality, dwell times at bus stops, traffic signals, travel demand fluctuation, spatial and temporal correlations, etc. The developing world in particular is plagued by additional factors like lack of lane discipline, excess vehicles, diverse modes of transport and so on. This renders the bus arrival time prediction (BATP) to be a challenging problem especially in the developing world. Present disclosure provides system and method that implement recurrent neural networks (RNNs) for BATP (in real-time), wherein the system incorporates information pertaining to spatial and temporal correlations and seasonal correlations. More specifically, a Gated Recurrent Unit (GRU) based Encoder-Decoder (ED) model with one or more bi-directional layers at the decoder is implemented for BATP based on relevant additional synchronized inputs (from previous trips) at each step of the decoder. The system further captures congestion influences on travel time prediction.

15 Claims, 9 Drawing Sheets

(58) Field of Classification Search
CPC ....... G08G 1/096822; G08G 1/096838; G08G 1/096844; G01C 21/3492; G01C 21/34; G01C 21/3626; G01C 21/00; G01C 21/26; G01C 21/36; G01C 21/3629; G01C 21/3632; G01C 21/3635; G01C 21/3641; G01C 21/3644; G01C 21/3647; G01C 21/365; G01C 21/3652; G01C 21/3655; G01C 21/3658; G01C 21/3661; G01C 21/3415; G01C 21/3484; G01C 21/3691; G01C 21/3697; G06Q 10/047; G06Q 10/04; G06Q 10/063; G06Q 10/0833; G06Q 10/08355; G06Q 10/0838; G06N 5/04; G06N 20/00; G06N 20/20; G06N 3/08; G06N 5/01; G06N 5/013; G06F 17/18; G06F 30/20
See application file for complete search history.

(56) References Cited

OTHER PUBLICATIONS

Petersen, Niklas Christoffer et al., "Multi-output Bus Travel Time Prediction with Convolutional LSTM Neural Network", Expert Systems with Applications, Date: Mar. 2019, vol. 120, pp. 426-435, Publisher: Science Direct, https://arxiv.org/pdf/1903.02791.pdf.

Xie, Zhi-Ying et al., "Multistep Prediction of Bus Arrival Time with the Recurrent Neural Network", Mathematical Problems in Engineering, Date: 2021, vol. 2021, Publisher: Hindawi, https://downloads.hindawi.com/journals/mpe/2021/6636367.pdf.

* cited by examiner

SYSTEMS AND METHODS FOR PUBLIC TRANSIT ARRIVAL TIME PREDICTION

PRIORITY CLAIM

This U.S. patent application claims priority under 35 U.S.C. § 119 to: Indian Patent Application No. 202221042121, filed on Jul. 22, 2022. The entire contents of the aforementioned application are incorporated herein by reference.

TECHNICAL FIELD

The disclosure herein generally relates to travel time predictions, and, more particularly, to systems and methods for public transit arrival time prediction.

BACKGROUND

Arrival/Travel times for public transit exhibit variability on account of factors like seasonality, dwell times at bus stops, traffic signals, travel demand fluctuation, spatial and temporal correlations, etc. The developing world in particular is plagued by additional factors like lack of lane discipline, excess vehicles, diverse modes of transport and so on. This renders the vehicle (e.g., bus) arrival time prediction (V/BATP) to be a challenging problem especially in the developing world.

SUMMARY

Embodiments of the present disclosure present technological improvements as solutions to one or more of the above-mentioned technical problems recognized by the inventors in conventional systems.

For example, in one aspect, there is provided a processor implemented method for public transit arrival time prediction. The method comprises obtaining, via one or more hardware processors, a route information pertaining to one or more trips associated to one or more vehicles; segmenting, via the one or more hardware processors, the route information into a plurality of sections, wherein each of the plurality of sections comprises travel time of the one or more trips, and wherein the travel time comprises running time and dwell time; grouping, via the one or more hardware processors, for each trip (i) travel time of one or more previous sections with reference to a current section, and (ii) travel time of one or more previous sections of a historical trip from a previous week, to obtain a grouped trip data; generating, via an encoder comprised in an encoder-decoder model via the one or more hardware processors, a context vector using the grouped trip data, wherein the encoder-decoder model further comprises a decoder, and one or more bidirectional layers at the decoder; and predicting, by the decoder via the one or more hardware processors, a travel time for one or more subsequent sections, for one or more trips based on one or more exogenous inputs comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the travel time for the one or more subsequent sections.

In an embodiment, the travel times for the subsequent sections of the closest previous trip serve as one or more real time recent congestion indicators.

In an embodiment, the method further comprises capturing, at the decoder of the encoder-decoder model comprising the one or more bi-directional layers, an upstream propagation of one or more congestions that originate downstream in the one or more subsequent sections.

In an embodiment, the travel time of a previous section with reference to a current section, specific to one or more trips, constitute spatial correlations.

In an embodiment, the travel time of previous week trip constitutes weekly seasonal correlations, and the previous week trip is determined based on a minimum difference in the travel times of historical trips from the same weekday and a current trip.

In another aspect, there is provided a processor implemented system for public transit arrival time prediction. The system comprises: a memory storing instructions; one or more communication interfaces; and one or more hardware processors coupled to the memory via the one or more communication interfaces, wherein the one or more hardware processors are configured by the instructions to: obtain a route information pertaining to one or more trips associated to one or more vehicles; segment the route information into a plurality of sections, wherein each of the plurality of sections comprises travel time of the one or more trips, and wherein the travel time comprises running time and dwell time; group for each trip (i) travel time of one or more previous sections with reference to a current section, and (ii) travel time of one or more previous sections of a historical trip from a previous week, to obtain a grouped trip data; generate, via an encoder comprised in an encoder-decoder model stored in the memory, a context vector using the grouped trip data, wherein the encoder-decoder model further comprises a decoder, and one or more bidirectional layers at the decoder; and predict, by the decoder, a travel time for one or more subsequent sections, for one or more trips based on one or more exogenous inputs comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the travel time for the one or more subsequent sections.

In an embodiment, the travel times for the subsequent sections of the closest previous trip serve as one or more real time recent congestion indicators.

In an embodiment, the one or more hardware processors are further configured by the instructions to capture, at the decoder of the encoder-decoder model comprising the one or more bi-directional layers, an upstream propagation of one or more congestions that originate downstream in the one or more subsequent sections.

In an embodiment, the travel time of a previous section with reference to a current section, specific to one or more trips, constitute spatial correlations.

In an embodiment, the travel time of previous week trip constitutes weekly seasonal correlations, and the previous week trip is determined based on a minimum difference in the travel times of historical trips from the same weekday and a current trip.

In yet another aspect, there are provided one or more non-transitory machine-readable information storage mediums comprising one or more instructions which when executed by one or more hardware processors cause public transit arrival time prediction by obtaining a route information pertaining to one or more trips associated to one or more vehicles; segmenting the route information into a plurality of sections, wherein each of the plurality of sections comprises travel time of the one or more trips, and wherein the travel time comprises running time and dwell time; grouping for each trip (i) travel time of one or more previous sections with reference to a current section, and (ii) travel time of one or more previous sections of a historical trip from a previous week, to obtain a grouped trip data; generating, via an encoder comprised in an encoder-decoder model, a context vector using the grouped trip data, wherein the encoder-decoder model further comprises a decoder, and one or more bidirectional layers at the decoder; and predicting, by the decoder, a travel time for one or more subsequent sections, for one or more trips based on one or more exogenous inputs comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the travel time for the one or more subsequent sections.

In an embodiment, the travel times for the subsequent sections of the closest previous trip serve as one or more real time recent congestion indicators.

In an embodiment, the one or more instructions which when executed by the one or more hardware processors further cause capturing, at the decoder of the encoder-decoder model comprising the one or more bi-directional layers, an upstream propagation of one or more congestions that originate downstream in the one or more subsequent sections.

In an embodiment, the travel time of a previous section with reference to a current section, specific to one or more trips, constitute spatial correlations.

In an embodiment, the travel time of previous week trip constitutes weekly seasonal correlations, and the previous week trip is determined based on a minimum difference in the travel times of historical trips from the same weekday and a current trip.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
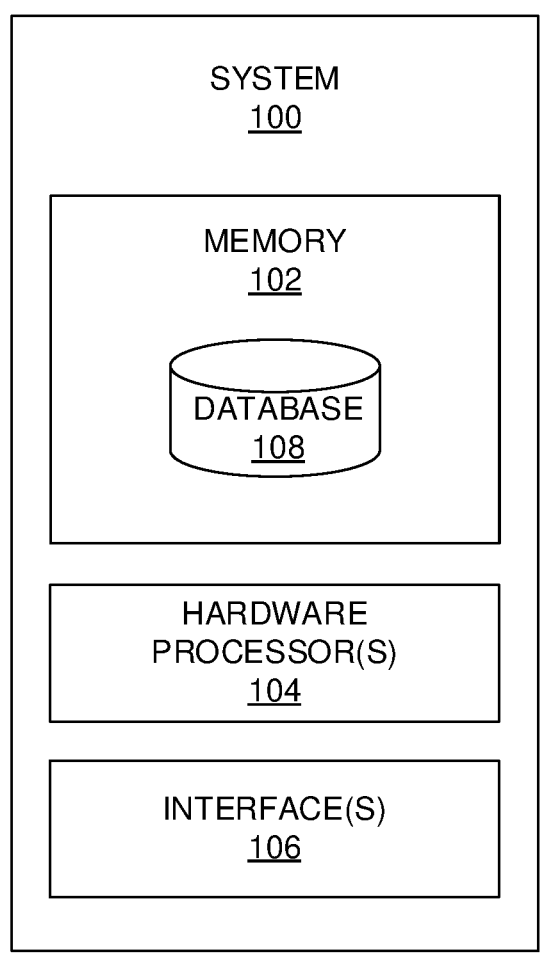
FIG. 1 depicts an exemplary system for public transit arrival time prediction, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Constantly increasing traffic congestion levels is a perennial problem across geographies on account of steadily increasing urban population and associated traffic volumes. Enhancing the public transit standard is one promising approach to mitigate this ubiquitous problem. This not only reduces traffic volumes and congestion in turn but would also curtail pollution. Public transit needs to be reliable to remain attractive among commuters. This would mean maintaining schedules to the extent feasible and providing accurate arrival time predictions in real-time. Such accurate estimates can aid commuters plan their arrival to bus-stops and minimize waiting times. Bus travel time predictions can also aid passengers who plan/decide to board a bus based on predictions to reach a desired destination bus-stop. The bus arrival time prediction (BATP) can potentially also aid transport administrators take real-time corrective measures when the bus is off schedule. Hence providing quality BATPs is crucial for reliable mass transit.

Literature around BATP research is about two decades old. In developed countries, it is arguably a well solved problem. However, it continues to be a challenging research problem in the context of developing economies. The main factors contributing to this include (1) lack of lane discipline, (2) inhomogeneity of traffic (i.e., transport modes can range from bicycles, two wheelers to heavy vehicles like trucks and buses) with dedicated lanes absent for specific modes of transport. This is referred to this as mixed traffic conditions. The real data that the system and method consider in the present disclosure from a bus route in a city in India which routinely experiences such conditions. The mass transit based BATPs (in real time) in Indian conditions are mostly absent on Google® maps currently. Any Google® map-based travel time query (in most cities in India) has mostly returned a constant prediction irrespective of the date or time of query. These returned (fixed) travel times seem to be based on some pre-fixed schedules which are almost unimplementable given the chaotic nature of traffic here. Owing to these aforementioned factors, BATP is still a challenging research problem (e.g., refer "P. Ranjitkar, L. S. Tey, E. Chakravorty, and K. L. Hurley, "Bus arrival time modeling based on Auckland data," Transportation Research Record, vol. 2673, no. 6, pp. 1-9, 2019.") especially under mixed traffic conditions (e.g., refer "A. Achar, D. Bharathi, B. A. Kumar, and L. Vanajakshi, "Bus arrival time prediction: A spatial kalman filter approach," IEEE Transactions on Intelligent Transportation Systems, vol. 21, no. 3, pp. 1298-1307, 2020.", and "C. Paliwal and P. Biyani, "To each route its own eta: A generative modeling framework for eta prediction," in 2019 IEEE Intelligent Transportation Systems Conference (ITSC), October 2019, pp. 3076-3081.").

The BATP literature has seen a wide range of methods over the years. A broad predominant line of attack comes from the class of data-driven methods. Most of them segment an entire route into smaller segments (or sections) either uniformly (e.g., refer "L. Vanajakshi, S. C. Subramanian, and R. Sivanandan, "Travel time prediction under heterogeneous traffic conditions using global positioning system data from buses," IET Intelligent Transportation Systems, vol. 3(1), pp. 1-9, 2009.") OR based on non-uniform segments connecting successive bus-stops. The data input in such methods can range over entities like flow, density, speed, travel time etc. depending on the sensing infrastructure in place and the algorithm. In the present disclosure, the system and method described herein consider scenarios where input data comes only from travel times experienced at each of these sections/segments. Such travel times can be easily obtained from AVL (automatic vehicle location) data gathered via GPS sensing.

Existing data-driven methods for BATP have adopted a diverse range of techniques which include autoregressive integrated moving average (ARIMA) models, linear statistical models like Kalman filters, support vector machines, feedforward Artificial Neural Networks (ANNs), recurrent neural networks, Convolutional Neural Networks (CNNs) and so on. Most of the existing approaches suffer from a variety of issues such as (i) not exploiting the historical data sufficiently for model calibration, OR (ii) do not exploit spatial correlations, (iii) fail to capture temporal correlations, (iv) do not exploit the current real-time information sufficiently, and (v) segment the time-axis into uniform bins, which can lead to inaccurate predictions.

From a Recurrent Neural Network (RNN) literature perspective, there's been recent work where people have explored Encoder-Decoder (ED) (also known as Seq2Seq) architectures for real-valued data (timeseries (TS) in particular). However, employing a Seq2Seq (ED) architecture for BATP as prescribed in these time-series approaches is not immediately evident due to difference in structure of available data between BATP and traditional time-series. In particular, GPS based data has a unique spatio-temporal aspect with information scattered across trips throughout the day.

Embodiments of the present disclosure provide system and method that implement encoder-decoder (ED) architecture (different from classical machine translation architecture OR existing ED approaches for time-series) which is also distinct from all existing BATP approaches (in particular from ED based BATP approaches also (e.g., refer "N. C. Petersen, F. Rodrigues, and F. C. Pereira, "Multi-output bus travel time prediction with convolutional Long Short Term Memory (LSTM) neural network," Expert Syst. Appl., vol. 120, pp. 426-435, 2019.", and "X. Ran, Z. Shan, Y. Fang, and C. Lin, "An LSTM-based method with attention mechanism for travel time prediction," Sensors, vol. 19, no. 4, 2019. [Online]. Available: https://www.mdpi.com/1424-8220/19/4/861"). It exploits current real-time spatiotemporal correlations and historical seasonal correlations for nonlinear modelling and prediction. Specifically, the system and method of the present disclosure provide an Encoder-Decoder based RNN for BATP capturing both spatio-temporal correlations between section travel times. Travel times from the just traversed sections of current bus (constitute the spatial correlations) are fed as inputs to an encoder. While real-time information coming from previous bus's travel times across subsequent sections (constituting temporal correlations) are fed in a synchronized sequential fashion into the decoder as additional inputs. Note that these synchronized inputs at the decoder are absent in the classic ED application for machine translation (e.g., refer "K. Cho, B. van Merri"enboer, C. Gulcehre, D. Bandanau, F. Bougares, H. Schwenk, and Y. Bengio, "Learning phrase representations using RNN encoder—decoder for statistical machine translation," in Proceedings of the 2014 Conference on Empirical Methods in Natural Language Processing (EMNLP), October 2014, pp. 1724-1734.", and "I. Sutskever, O. Vinyals, and Q. V. Le, "Sequence to sequence learning with neural networks," in Proceedings of the 27th International Conference on Neural Information Processing Systems—Volume 2, 2014, p. 3104-3112."). Weekly seasonal correlations are also incorporated via additional inputs from the closest trip of the previous week.

More specifically, the system and method implement a bidirectional layer at the decoder as this can now capture (for a given section) the possible influence of past congestions (in time) across the subsequent sections propagating backward in space. This feature of the implemented ED architecture is unexplored in other conventional time-series based applications of ED.

The system of the present disclosure demonstrates via experiments and results of the method's effectiveness on real field data gathered from a route in a mixed traffic condition from a city. The experiments clearly illustrate superior performance of the method of the present disclosure compared to state-of-art baselines.

Over the last decade or two, the literature on BATP has seen many different approaches. A variety of data inputs like flow information, travel times, speed, weather, scheduled timetables, crowd-sourced data and so on have been considered by researchers for prediction. One can divide the diverse landscape of approaches into two broad categories: (i) traffic-theory based, and (ii) data-driven.

Data-driven methods, instead of adopting a detailed modeling based on physics of the traffic, typically employ a coarse model (based on measurable entities) that is good enough for the prediction problem at hand. There exist a class of methods which utilize a data-based model but do not perform learning based on historical data in a full-fledged sense. Rest of the approaches learn from past historical data to estimate the necessary parameters of a suitable predictive model, which is employed further for real-time predictions.

Without Learning: This is a class of methods which do not learn from historical data explicitly. A trivial approach of using previous bus real-time measurements as final predictions was proposed by B. Kidwell (e.g., refer "Predicting transit vehicle arrival times," Geo Graphics Laboratory, Bridgewater State College, Bridgewater, MA, USA, Tech. Rep., 2001.). One of the first Kalman filter approaches was proposed by A. Shalaby and A. Farhan, (e.g., refer "Bus travel time prediction for dynamic operations control and passenger information systems," in 82nd Annual Meeting of the Transportation Research Board. Washington D.C., USA:

National Research Council, 2003.), which used travel times of previous bus and travel times from previous day (same time), as inputs.

The method captures temporal dependencies only with an adhoc parameter choice in the state space model. The later approaches which employ a linear state-space model involving travel times, calibrate (or fix) the data-based model parameters in real time. These parameters are chosen either based on (a) current data of previous bus or (b) a suitable optimal travel-time data vector from the historical database.

Explicit Learning: The literature has seen a wide variety of learning methods from historical data. For instance, support vector regression and feed-forward ANN based methods have been proposed which capture only temporal correlations via multiple previous bus travel times. An SVR based prediction with static inputs like link length and dynamic inputs like rate of road usage and speed was also proposed by Yang et al (e.g., refer "M. Yang, C. C., L. Wangz., X. Yanx., and L. Zhou, "Bus arrival time prediction using support vector machine with genetic algorithm," Neural Network World, vol. 3, pp. 205-217, 2016."). However, Yang et al does not consider current bus position OR the previous bus inputs. An ANN based prediction with inputs like schedule adherence, dwell time and arrival time was also proposed without considering information from the previous bus. Another research work proposed a speed-based prediction scheme using a weighted average of historically averaged section speed and current bus speed as inputs, while ignores information from previous bus as earlier. Yet another research work considered a dynamic SVR based prediction scheme where current bus's travel time at the previous section and previous bus's travel time at the current section are considered as inputs during training. This scheme exploits both spatial and temporal correlations in the data in a minimal way.

In a further research work, a single hidden layer feed-forward ANN was trained (e.g., refer "W. Fan and Z. Gurmu, "Dynamic travel time prediction models for buses using only gps data," International Journal of Transportation Science and Technology, vol. 4, no. 4, pp. 353-366, 2015.") based on current position of the bus and time of query to predict arrival times across all subsequent stops. It learns a single model to predict travel times between any two bus stops on the route. This renders the target travel time variable's dynamic range very large in this method. An LSTM based RNN approach was proposed which basically used a many to many architecture for training and captures temporal correlations in the data. A recent approach capturing spatiotemporal correlations based on linear statistical models (nonstationary) was proposed (e.g., refer "A. Achar, D. Bharathi, B. A. Kumar, and L. Vanajakshi, "Bus arrival time prediction: A spatial kalman filter approach," IEEE Transactions on Intelligent Transportation Systems, vol. 21, no. 3, pp. 1298-1307, 2020.") which used a linear Kalman filter for prediction across sections. This work used linear models to capture the spatial correlations. The temporal correlations come from the (currently plying) previous bus section travel time. A CNN based approach capturing spatiotemporal correlations was proposed recently where the conditional predictive distributions were parameterized using masked-CNNs. The CNN output modeled the travel-time between any two bus-stops in a quantized form.

An interesting approach based on combining CNNs and RNNs was provided by Petersen et al. (e.g., refer "N. C. Petersen, F. Rodrigues, and F. C. Pereira, "Multi-output bus travel time prediction with convolutional lstm neural network," Expert Syst. Appl., vol. 120, pp. 426-435, 2019."). In particular the convolutional layer captured the (one-dimensional) spatial correlations from the adjacent sections of the 1-D route, while the recurrent structure captures the temporal correlations. A convolutional-RNN based ED architecture was also employed to capture accurate multi time-step predictions. In a further research work, an attention-based extension of one of the above research works was used. In yet a further research work, a simplified RNN with no state feedback (in spite of weight sharing across time-steps) with attention was considered, but only modeled single time-step predictions. In all these three RNN approaches, the time axis is partitioned uniformly into time bins (of width 15-min).

The ED architecture was first successfully proposed for language translation applications. The architecture was relatively simple with the context from the last time-step of the encoder fed as initial state and explicit input for each time-step of the decoder. Over the years, machine translation literature has seen intelligent improvements over this base structure by employing attention layer, bidirectional layer etc. in the encoder. Further, the ED framework has been successfully applied in many other tasks like speech recognition, image captioning etc.

Given the variable length Seq2Seq mapping ability, the ED framework naturally can be utilized for multi-step (target) time-series prediction where the raw data is real-valued, and target vector length can be independent of the input vector. An attention-based ED approach (with a bidirectional layer in the encoder) for multi-step TS prediction was also proposed which could potentially capture seasonal correlations as well. However, this architecture does not consider exogenous inputs.

From the above research works, it is clear that most existing approaches either fail to exploit historical data for model building OR fail to capture spatial or temporal correlations. The remaining approaches even though exploit the spatiotemporal correlations in different ways, these suffered different drawbacks. For instance, the travel time measurement at the current section from the previous bus (temporal correlation) was explored irrespective of when the previous bus made this traversal). The spatial correlation comes from travel time at the previous section from the current bus. Some research works addressed the issues as follows. It considers travel time measurements from multiple previous sections of the current bus to better capture the spatial correlations.

The temporal correlations here additionally factor the closeness of the previous bus by hypothesizing a parameterized functional form dependent on the start time difference and the current section travel time. It adopted a predominantly linear modelling approach culminating in a Linear Kalman filter for prediction. An SVM-based nonlinear generalization was considered in another research work. This research work learnt the potentially nonlinear spatial and temporal correlations at a single-step level and then employs an extended Kalman filter for spatial multistep prediction. However, these KF approaches adopt a recursive sequential multi-step prediction which can be prone to error accumulation. On the other hand, the ED method implemented by the system and the present disclosure circumvents this issue of both these KFs by training with vector targets where the predictions across all subsequent sections are padded together into one target-vector.

The CNN approach of another existing work (e.g., refer "C. Paliwal and P. Biyani, "To each route its own eta: A generative modeling framework for eta prediction," in 2019 IEEE Intelligent Transportation Systems Conference (ITSC), October 2019, pp. 3076-3081.") modeled the travel time targets as categorical values essentially using a softmax at the output layer. This approach hence is sensitive to the quantization level. A coarse quantization leads to some significant errors whenever the target is exactly between two consecutive levels.

On the other hand, a fine quantization leads to too many outputs which in turn leads to a large number of weights to be learnt and a potentially imbalanced multi-class problem. The method of the present disclosure on the other hand models the targets as real-valued.

Some of existing LSTM approaches as described above (e.g., refer N C. Petersen et al., Ran et al., and J. Wu, Q. Wu, J. Shen, and C. Cai—"Towards attention-based convolutional long short-term memory for travel time prediction of bus journeys," Sensors, vol. 20, no. 12, 2020. [Online]. Available: https://www.mdpi.com/1424-8220/20/12/3354) bin the time-axis into 15 minutes intervals. This strategy inherently assumes that the prediction across a link is constant for a 15-minute interval. However, this assumption can be restrictive and unrealistic especially during peak hours when the bus headway is low. Method of the present disclosure on the other hand does not make any such restrictive assumptions and we model time as a continuous entity.

While Petersen et al. also used an ED architecture for prediction, it employed sequential RNN to model time. In contrast, the sequential RNN (ED) as implemented by the present disclosure captures the spatial aspect of the problem. Accordingly, the decoder output of the system of the present disclosure models the travel times across the subsequent sections of the currently plying bus. In contrast, Petersen et al. used a 1-D CNN to capture spatial correlations. Further, the method of the present disclosure captures temporal correlations by feeding the entry and travel times of the closest previous bus at subsequent sections as decoder inputs in a space synchronized fashion. Further, system and method also use a bidirectional layer at the decoder to capture possible upstream propagating congestion influences. This makes ED method of the present disclosure very different from that of Petersen et al.

System and method of the present disclosure implement an Encoder-Decoder model comprising an encoder, a decoder and one or more bidirectional layers at the decoder. In the present disclosure, the system segments the given bus route uniformly into sections. The input training data includes travel times experienced across each of these sections for all transpired trips along the given route. The observed section travel times, include the running time across the section and the dwell time at the possible bus-stops in the section. As mentioned above, travel times were obtained from AVL data obtained via high frequency GPS based sensing. The system and method of the present disclosure implemented a uniform segmentation. This was chosen for two reasons. (i) splitting the route uniformly into segments and predicting bus travel time between any two bus stops reported reasonable performance. (ii) Ease of testing across multiple bus-routes. Non-uniform segmenting where segment ends correspond to bus-stops means significant additional book-keeping. (iii) Ease of adapting section-level predictions to the bus-stop level as explained next.

The learning and prediction method as implemented by the system and present disclosure can also be used as it is under non-uniform segmenting of the route (where the section travel times will now be travel times between two consecutive bus-stops).

Adapt to bus-stop level: Also, the predictions based on uniform segmenting which predict between any two segments can be easily adapted to predict between any two bus-stops. Specifically, given any two bus stops i and j, the system and method could consider the segment start in which bus-stop i lies and perform the ED based prediction till the end of the segment which contains bus-stop j. The system and method need to subtract the expected dwell time at bus-stop j and the expected semi-segment travel times at the start and end segment of the multistep prediction. The semi-segment lengths depend on the position of the bus-stop i and j in their respective segments.

Capturing Spatio-Temporal and Seasonal Correlations Motivation: One of the factors influencing the section travel time Z n at section n, could be its preceding section travel times. This can be motivated as follows. The preceding section travel times can give strong indicators of congestion propagation moving downstream along the route or impending congestions (with above average travel times) at the subsequent sections across which prediction is to be made. It can also help the system and method capture patterns present in the historical data between section travel times.

Further, in addition to the section travel times of the previously traversed sections of the currently plying bus, travel times experienced by previous buses (most recent) across the subsequent sections can also be a strong source of information. This can help better estimate the potential travel times to be experienced by the current bus in the subsequent sections ahead. The system and method indicated the associated section travel times by $Z_n^{pv}$ and the section entry times by $T_n^{e;pv}$.

In addition to the above real-time information, given strong weekly patterns in similar traffic data in general, the system and method exploit information from a historical trip from the previous week whose start time is closest to that of the current trip. The associated section travel times is indicated by $Z_n^{pw}$ and section entry times by $T_n^{e;pw}$.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 depicts an exemplary system 100 for public transit arrival time prediction, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks (N/W) and protocol types, including wired networks, for example, Local Access Network (LAN), cable, etc., and wireless networks, such as wireless LAN (WLAN), cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to historical data of vehicles, such as route information, corresponding travel times, sections of the historical trips, and the like. The database 108 further comprises various machine learning models such as Recurrent Neural Network, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
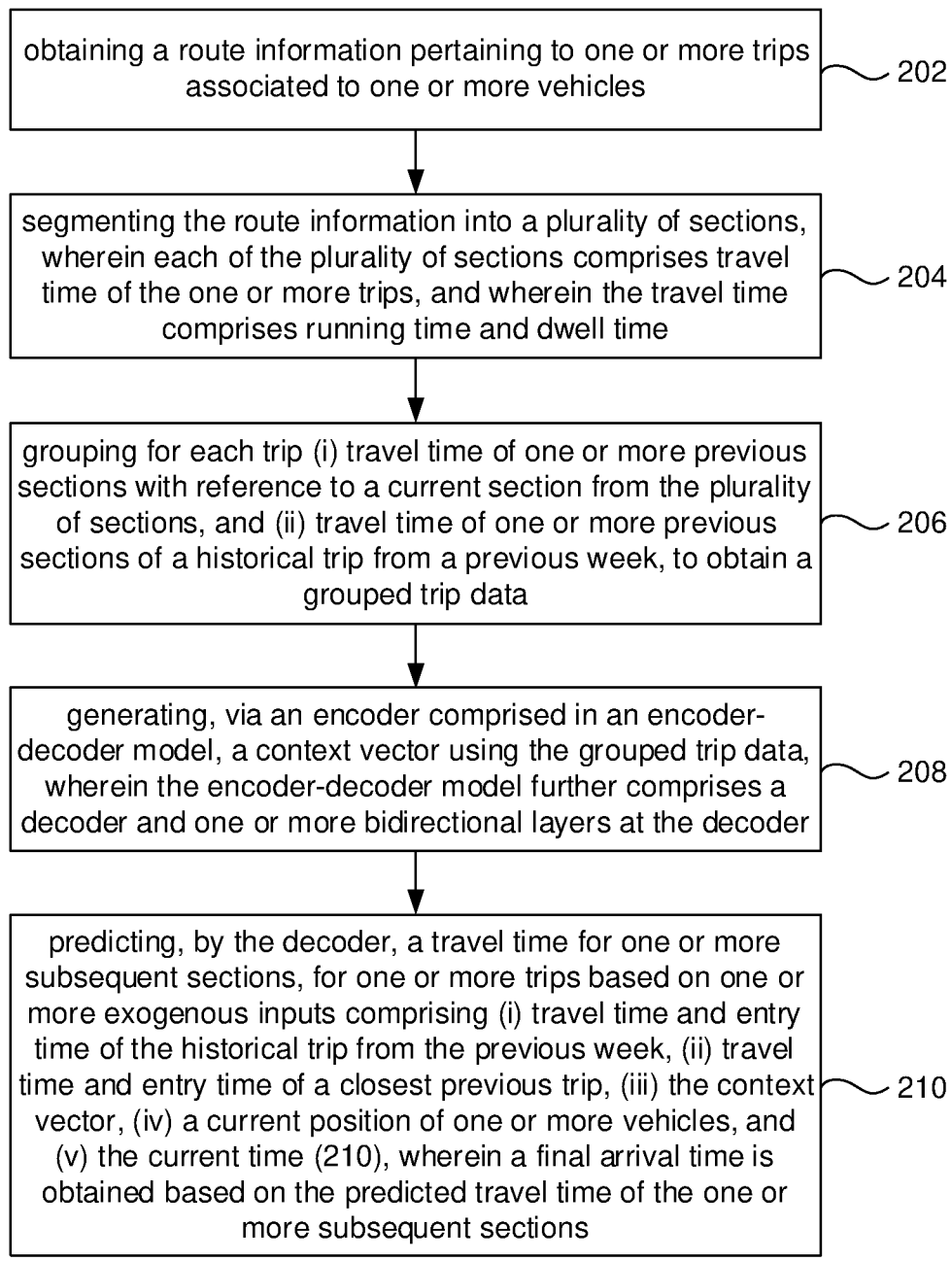
FIG. 2 depicts an exemplary flow chart illustrating a method for public transit arrival time prediction, using the system of FIG. 1, in accordance with an embodiment of the present disclosure.

FIG. 2 depicts an exemplary flow chart illustrating a method for public transit arrival time prediction, using the system 100 of FIG. 1, in accordance with an embodiment of the present disclosure. In an embodiment, the system (s) 100 comprises one or more data storage devices or the memory 102 operatively coupled to the one or more hardware processors 104 and is configured to store instructions for execution of steps of the method by the one or more processors 104. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously. The steps of the method of the present disclosure will now be explained with reference to components of the system 100 of FIG. 1, and the flow diagram as depicted in FIG. 2.

At step 202 of the method of the present disclosure, the one or more hardware processors 104 obtain a route information pertaining to one or more trips associated to one or more vehicles. As mentioned above, route information comprised of travel times that were obtained from AVL data obtained via high frequency Global Positioning System (GPS) based sensing.

At step 204 of the method of the present disclosure, the one or more hardware processors 104 segment the route information into a plurality of sections. Each of the plurality of sections comprises travel time of the one or more trips. The travel time comprises running time and dwell time. The system 100 segments the given route uniformly into sections. The input training data includes travel times experienced across each of these sections for all transpired trips along the given route. The observed section travel times, include the running time across the section and the dwell time at the possible bus-stops in the section. The system and method of the present disclosure implemented a uniform segmentation. Uniform segmentation was chosen for two reasons. (i) splitting the route uniformly into segments and predicting bus travel time between any two bus stops reported reasonable performance. (ii) Ease of testing across multiple bus-routes. Non-uniform segmenting refers to segmentation where segment ends correspond to bus-stops means significant additional book-keeping—(a) Ease of adapting section-level predictions to the bus-stop level as explained next.

Figure 3:
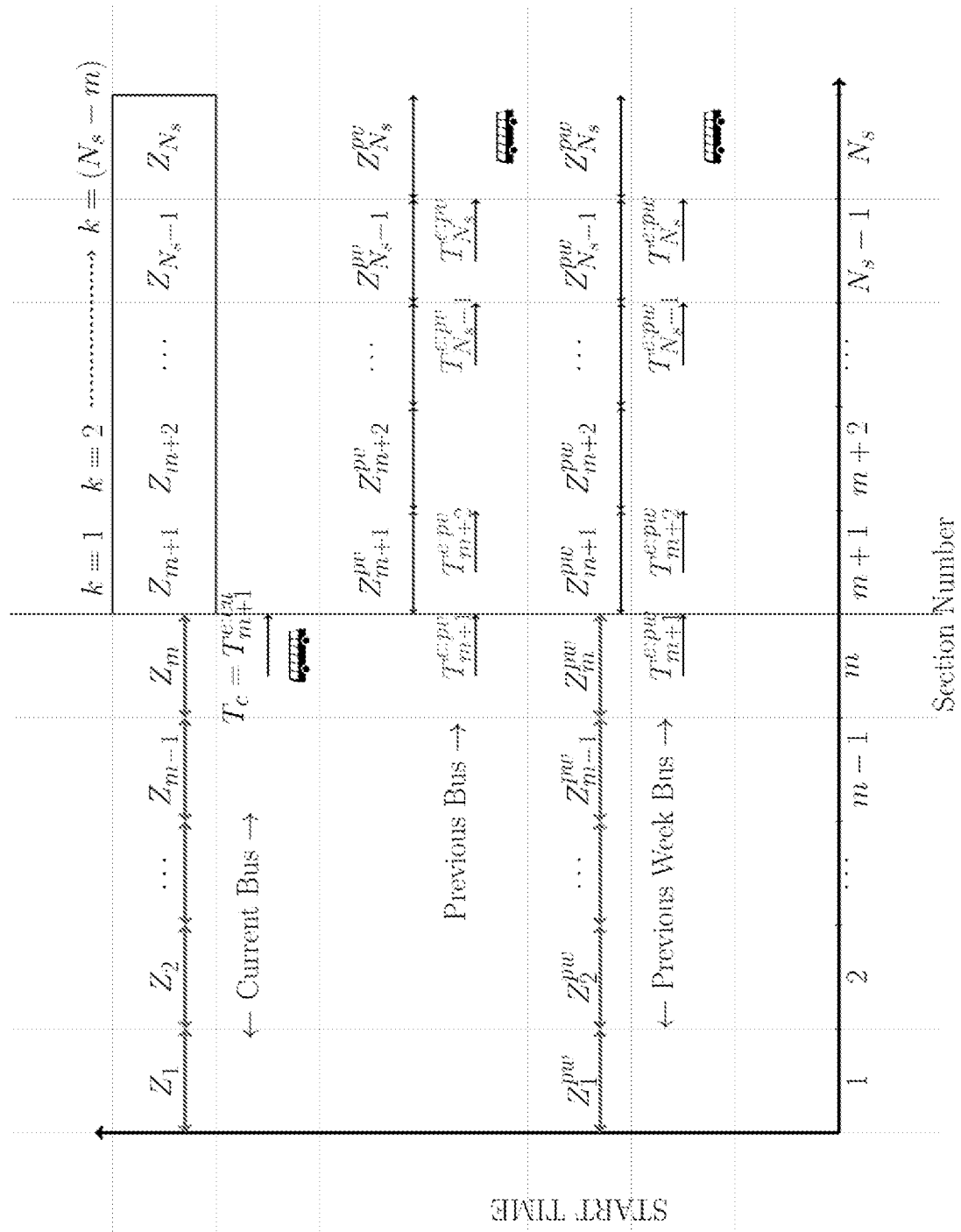
FIG. 3 illustrates spatio-temporal and seasonal correlations between travel times of various sections of route information, in accordance with an embodiment of the present disclosure.

At step 206 of the method of the present disclosure, the one or more hardware processors 104 group for each trip (i) travel time of one or more previous sections with reference to a current section from the plurality of sections, and (ii) travel time of one or more previous sections of a historical trip from a previous week, to obtain a grouped trip data. The above step of obtaining grouped trip data can be better understood by way of following description:

Bus (e.g., vehicle as described by the method of the present disclosure and interchangeably used herein) Arrival Time Prediction (BATP), the dynamic real-time prediction problem can be formally stated as follows in view of the just described inputs potentially influencing prediction. Given (a) current bus's position in real-time (say at the end of section m) (b) current time (equivalent to $T_{m+1}^{e:cu}$, the current bus's entry time into section m+1) (c) previous section travel times of the current bus (d) section travel times (ahead of section m) of the closest previous bus and (e) section travel times (beyond section m) from a historical trip of the previous week (but same weekday) with the nearest trip start time to that of the current trip, one needs to estimate subsequent section travel times beyond section m of the current bus. FIG. 3 gives a clear pictorial spatial layout of all the relevant input entities that influence prediction and the associated target variables of interest. More specifically, FIG. 3, with reference to FIGS. 1 and 2, illustrates spatio-temporal and seasonal correlations between travel times of various sections of route information, in accordance with an embodiment of the present disclosure. In the present disclosure, the travel time of a previous section with reference to a current section, specific to one or more trips, constitute spatial correlations. The travel times across the plurality of subsequent sections corresponding to the current trip and the closest previous trip constitutes temporal correlations. The travel time of previous week trip constitutes weekly seasonal correlations. The previous week trip is determined based on a minimum difference in the travel times of historical trips from the same weekday and a current trip. The various travel times and entry times from the current bus, previous bus, and the closest trip from the previous week, and same weekday are clearly provided. m denotes the current bus position, while $N_s$ denotes the total number of sections. Given the current position m and current time $T_c$, which is also the entry time of the bus into section m+1 (i.e., $T_{m+1}^{e:cu}$), the system and method learn an input-output function of the below form:

$$(Z_{m+1}, Z_{m+2}, \ldots, Z_{N_s-1}, Z_{N_s}) = $$

$$F\begin{pmatrix} m, T_c, \underline{Z_m, Z_{m-1}, \ldots Z_2, Z_1}, z_{m+1}^{pv}, z_{m+2}^{pv}, \ldots, z_{N_s-1}^{pv}, z_{N_s}^{pv}, T_{m+1}^{e:pv}, T_{m+2}^{e:pv}, \ldots, T_{N_s-1}^{e:pv}, T_{N_s}^{e:pv}, \\ \underline{Z_{m+1}^{pw}, Z_{m+2}^{pw}, \ldots, Z_{N_s-1}^{pw}, Z_{N_s}^{pw}, T_{m+1}^{e:pw}, T_{m+2}^{e:pw}, \ldots, T_{N_s-1}^{e:pw}, T_{N_s}^{e:pw}, Z_m^{pw}, Z_{m-1}^{pw}, \ldots, Z_2^{pw}, Z_1^{pw}} \end{pmatrix}$$

(1)

Figure 4:
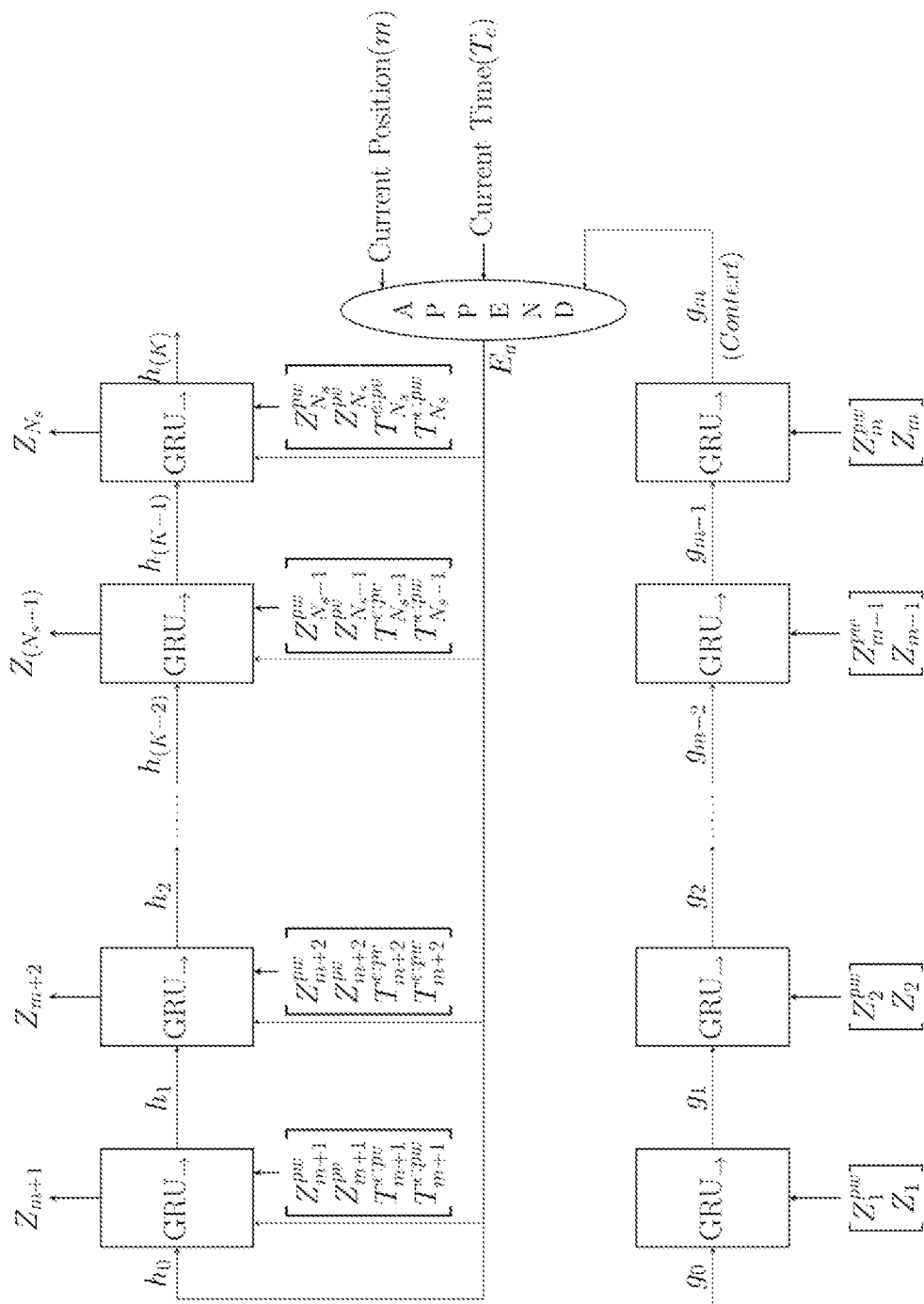
FIG. 4 depicts an Encoder-Decoder model as implemented by the system of FIG. 1, in accordance with an embodiment of the present disclosure.

The inputs have been grouped into 3 categories (based on the style of underlining). The first category corresponds to the current bus information, namely its current position m, its section travel times along traversed sections. The second category is the section travel and entry times from the closest previous bus across all subsequent sections. The third category includes section travel time from all sections of the closest previous week trip, while its section entry times from only the subsequent sections. It is to be noted that the system and method described herein do not use the previous section travel times from the previous trip as the current trip travel times across the previous sections are more recent. In this regards, FIG. 4, with reference to FIGS. 1 through 3, depicts an Encoder-Decoder model as implemented by the system of FIG. 1, in accordance with an embodiment of the present disclosure. The Encoder-Decoder model comprises an encoder, a decoder and one or more plurality of bidirectional layers at the decoder as depicted in FIG. 4.

The prediction problem of the system and method can be viewed as a spatial multi-step prediction problem, where at $i^{th}$ step the system and method either predict (i) the travel time across the $(m+i)^{th}$ segment OR (ii) travel time to reach end of $(m+i)^{th}$ segment. The system and method stick to the former in the present disclosure. Given the variable length Seq2Seq mapping ability, the ED framework (or the method described herein by the present disclosure) naturally can be utilized for the spatial multi-step (target) prediction where the system 100 train with vector valued targets, with vector size equal to the number of sections ahead ($N_s$–m). The equation (1) is rewritten by reorganizing its inputs as follows which aids in clearly associating the inputs and outputs of the regression function F(.) to the Encoder-Decoder model (also referred as ED architecture/framework and interchangeably used herein).

$$(Z_{m+1}, Z_{m+2}, \ldots, Z_{N_s-1}, Z_{N_s}) = \quad (2)$$

$$F\big(m, T_c, (Z_m, Z_m^{pw})(Z_{m-1}, Z_{m-1}^{pw}), \ldots (Z_2, Z_2^{pw}), (Z_1, Z_1^{pw}),$$

$$(Z_{m+1}^{pv}, Z_{m+1}^{pw}, T_{m+1}^{e:pv}, T_{m+1}^{e:pw}), (Z_{m+2}^{pv}, Z_{m+2}^{pw}, T_{m+2}^{e:pv}, T_{m+2}^{e:pw}), \ldots,$$

$$(Z_{N_s-1}^{pv}, Z_{N_s-1}^{pw}, T_{N_s-1}^{e:pv}, T_{N_s-1}^{e:pw}), (Z_{N_s-1}^{pv}, Z_{N_s-1}^{pw}, T_{N_s-1}^{e:pv}, T_{N_s-1}^{e:pw})\big)$$

All the previous section travel times from the current bus and the previous week trip have been grouped. These two pairs of inputs are fed as encoder inputs unfolded up to m steps (FIG. 4). In the second group, the system and method bring together section travel times and entry times of the previous bus and an appropriate previous week trip. These inputs in pairs of four are fed as additional inputs at each step of the decoder, where the decoder is unfolded into ($N_s$–m) steps. The intuition is that not just the subsequent section travel time, but also the time at which the traversal happened (entry time into that section) has an influence. Closer the entry time of the previous bus to the current bus's likely entry time, higher is its influence. In the present disclosure, the current bus's likely entry time into section m+i would be inherently represented in the hidden state $h_i$.

Referring to steps of FIG. 2, at step 208 of the method of the present disclosure, the one or more hardware processors 104 generate, via an encoder comprised in an encoder-decoder model, a context vector using the grouped trip data. The encoder-decoder model further comprises the decoder and one or more bidirectional layers at the decoder as depicted in FIG. 4. The encoder-decoder model is comprised in the memory 102 and invoked by the system 100 for execution and to perform the method described herein. In the present disclosure, the encoder-decoder model is also referred as Gated Recurrent Unit (GRU) based Encoder-Decoder (ED) or a Seq2Seq (Sequence to Sequence) RNN model, or the ED architecture/framework or the system 100 and interchangeably used herein. The context vector generation is depicted in FIG. 4.

At step 210 of the method of the present disclosure, the one or more hardware processors 104 predict, by using the decoder, a travel time for one or more subsequent sections, for one or more trips based on one or more exogenous inputs comprising (i) travel time and entry time of the historical trip from the previous week, (ii) travel time and entry time of a closest previous trip, (iii) the context vector, (iv) a current position of one or more vehicles, and (v) the current time. A final arrival time is obtained based on the predicted travel time for the one or more subsequent sections. For instance, the cumulation of the predicted travel time of the one or more subsequent sections may be outputted as the final arrival time of the one or more vehicles. The above steps of 208 and 210 are better understood by way of following description:

Gating Unit in the Encoder-Decoder model: Amongst the three standard recurrent structure choices of plain RNN (without gating), LSTM (e.g., refer "S. Hochreiter and J. Schmidhuber, "Long short-term memory," Neural Comput., vol. 9, no. 8, p. 1735-1780, November 1997.") and GRU (e.g., refer "J. Chung, C. Gulcehre, K. Cho, and Y. Bengio, "Empirical evaluation of gated recurrent neural networks on sequence modeling," in NIPS 2014 Deep Learning and Representation Learning Workshop, 2014. [Online]. Available: http://arxiv.org/abs/1412.3555"), the system and method described herein choose GRU in the present disclosure. Like LSTM unit, GRU also has a gating mechanism to mitigate vanishing gradients and have more persistent memory. But the lesser gate count in GRU keeps the number of weight parameters much smaller. GRU unit as the building block for RNNs is currently ubiquitous across sequence prediction applications. A single hidden layer plain RNN unit's hidden state can be specified as:

$$h_t = \sigma(W^h h_{t-1} + W^u u_t) \quad (3)$$

where $W^h$, $W^u$ are the weight matrices associated with the state at the previous time-instant $h_t$ and the current input ($u_t$) respectively, $\sigma(.)$ denotes sigma function. GRU based cell computes its hidden state (for one layer as follows).

$$z_t = \sigma(W^z u_t + U^z h_{t-1}) \quad (4)$$

$$r_t = \sigma(W^r u_t + U^r h_{t-1}) \quad (5)$$

$$\tilde{h}_t = \tan h(r_t \circ U h_{t-1} + W u_t) \quad (6)$$

$$h_t = z_t \circ h_{t-1} + (1-z_t) \circ \tilde{h}_t \quad (7)$$

where $z_t$ is update gate vector and r t is the reset gate vector. If the two gates were absent, the system and method essentially have the plain RNN. $\tilde{h}_t$ is the new memory (summary of all inputs so far) which is a function of $u_t$ and $h_{t-1}$—the previous hidden state. The reset signal controls the influence of the previous state on the new memory. The final current hidden state is a convex combination (controlled by $z_t$) of the new memory and the memory at the previous step, $h_{t-1}$. All associated weights $W^z$, $W^r$, $W$, $U^z$, $U^r$, U are trained using back-propagation through time (BPTT).

The system and method use the bidirectional layer at the decoder. The motivation for this comes primarily from the application. To predict $Z_{m+k}$, the unidirectional architecture as in FIG. 4 considers the previous bus's travel times up to section m+k only. However, the previous bus's travel times in subsequent sections beyond m+k can provide indicators of recent congestions further down in the route. These recent congestions can in turn potentially propagate backward in space and strongly influence the travel time of the current bus at section (m+k). To capture such eventualities, the system and method use a bidirectional layer as given in FIG. 5. In other words, the one or more hardware processors 104 capture, at the decoder of the encoder-decoder model comprising the one or more bi-directional layers, an upstream propagation of one or more congestions that originate downstream in the one or more subsequent sections. More specifically, FIG. 5, with reference to FIGS. 1 through 4, depicts a Bidirectional Decoder (also referred as decoder having one or more bidirectional layers) comprised in the Encoder-Decoder model, in accordance with an embodiment of the present disclosure. It is to be noted that $K=N_s-m$. $\vec{h}_{\overline{N_s}+1}=\vec{h}$ $\overleftarrow{0}=E_a$ which is output of the append block in FIG. 4.

Figure 5:
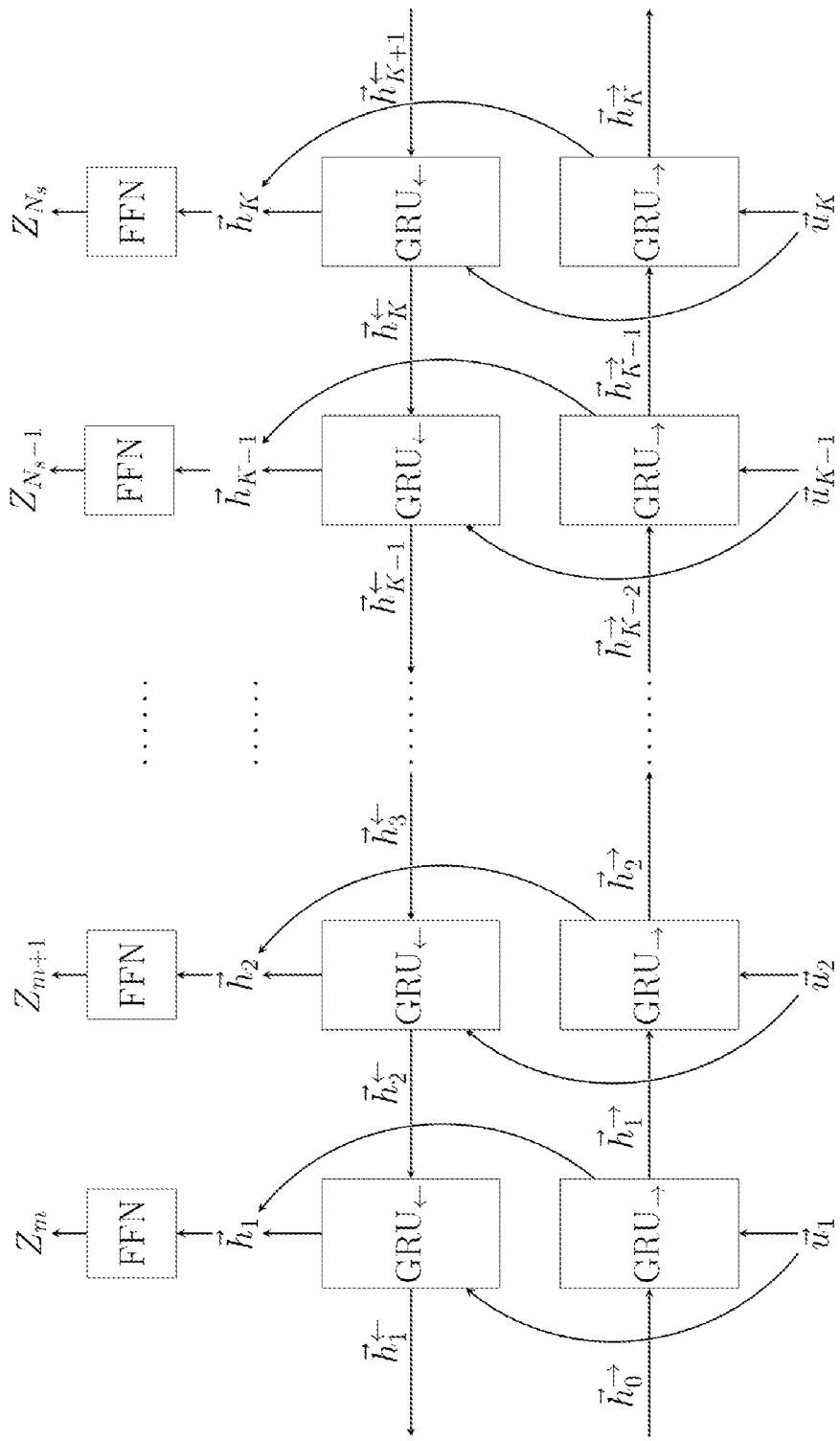
FIG. 5 depicts a Bidirectional Decoder (also referred as decoder having one or more bidirectional layers) comprised in the Encoder-Decoder model, in accordance with an embodiment of the present disclosure.

It is observed by the system and method of the present disclosure in the GRU-cell defining equations (equations (4)-(7)) how state-update $\vec{h}_{\vec{t}}=f_1(\vec{h}_{\vec{t}-1}, u_t)$ happens for each timestep with the state information flowing from left to right. In a bi-directional setting, an additional state-vector $\overleftarrow{h}$ $\overleftarrow{h}_t$ is available and $f_2$ is mapped, with an update $\overleftarrow{h}_t=f_2(\overleftarrow{h}_{t+1}, u_t)$ with reverse information flow. So, the state at time-step i, $h_i$, is a concatenation $[\vec{h}_i, \overleftarrow{h}_i]$. Note that $f_2$ like $f_1$ is governed by the same GRU-cell defining equations (equations (4)-(7)) with possibly different weight values. Each input $u_i$ in FIG. 5 is actually the concatenation of all inputs at the $i^{th}$ (each) step of the decoder in FIG. 4. The initial states $\overleftarrow{h}_{\overline{N_s}+1}$ and $\vec{h}_{\overleftarrow{0}}$ are equal and initialized to $E_a$, the output of the append block in FIG. 4.

Results

The system of the present disclosure tested and benchmarked the method described herein on one bus route from a city in India in detail. The route was uniformly segmented into sections of length 800 m resulting in a total of 34 segments. The section width was chosen keeping in mind (a) the actual number of bus-stops and (b) the number of resulting sections (N a). Having too many sections can be challenging on the model for long sub-route prediction, while long section length would mean poor predictions on short sub-route predictions. For training purposes, over each week, data from Mon to Sat was considered. This is because in Indian conditions, for a large segment of people, Saturday is also a working day. Further, a previous study (e.g., refer "B. A. Kumar, L. Vanjakshi, and S. C. Subramanian, "Daywise travel time pattern analysis under heterogeneous traffic conditions," Procedia—Social and Behavioral Sciences, vol. 104, pp. 746-754, 2013, $2^{nd}$ Conference of Transportation Research Group of India (2nd CTRG).") under similar conditions provided an evidence of Sunday traffic being very different from rest of the days. The data that was tested by the system and method of the present disclosure came from GPS measurements collected across all trips over 2 historical months namely September and October 2019. The raw GPS measurements had to be filtered off the GPS noise before computing the travel times across each of the 800 m segments that constitute a route. Since the route information is known, filtering was performed based on simple route projection. The learnt models were tested based on the last week's data (test period) while the remaining 7 weeks data was used for training. The prediction accuracy was evaluated based on Mean Absolute Error (MAE) and Mean Absolute Percentage Error (MAPE) metric. Percentage error is Absolute Error divided by true prediction expressed in percentage. While MAE provides a commuter understandable clock time difference in seconds, MAPE is a scale independent metric.

Benchmarking Details

It is noted by the system of the present disclosure that the method described herein is referred as EDU (unidirectional decoder) and EDB (bidirectional decoder). The bidirectional model version can lead to many more parameters in the decoder (in comparison to the unidirectional version) for a similar number of hidden nodes in the GRU cell. For consistency in the number of learnable parameters, the number of hidden nodes in the GRU-cell of the bidirectional decoder is kept lower so that the overall number of parameters in the bidirectional decoder matches that of the unidirectional decoder.

Baselines:

In the present disclosure, the system benchmarked the method (with or without bidirectional layer at the decoder) against 5 other state-of-art baselines: (a) many-to-many architecture inspired from research work (e.g., refer "D. Salinas, V. Flunkert, J. Gasthaus, and T. Januschowski, "Deepar: Probabilistic forecasting with autoregressive recurrent networks," International Journal of Forecasting, vol. 36, no. 3, pp. 1181-1191, 2020."—an RNN approach for sequential (timeseries) prediction in the presence of exogenous inputs). At each time step, the previous section travel time of current bus (prior sequential input from a DeepAR perspective) and current section travel time of previous bus (akin to the exogenous input in DeepAR) were fed as inputs to predict the current section travel time of the current bus. Overall, the baseline (indicated as DpAR henceforth) captured spatio-temporal correlations in a unique way. (b) a recent SVM approach (e.g., refer "K. K. Reddy, B. A. Kumar, and L. Vanajakshi, "Bus travel time prediction under high variability conditions," Current Science, vol. 111, no. 4, pp. 700-711, 2016." (SVM16)) which exploits temporal correlations only from multiple previous trips, (d) LNKF (e.g., refer "A. Achar, D. Bharathi, B. A. Kumar, and L. Vanajakshi, "Bus arrival time prediction: A spatial kalman filter approach," IEEE Transactions on Intelligent Transportation Systems, vol. 21, no. 3, pp. 1298-1307, 2020."), a linear kalman filter approach which captured spatio-temporal correlations using linear statistical models mainly, (e) SVKF (e.g., refer "A. Achar, R. Regikumar, and B. A. Kumar, "Dynamic bus arrival time prediction exploiting non-linear correlations," in 2019 International Joint Conference on Neural Networks (IJCNN), July 2019, pp. 1-8.", a nonlinear (SVM) based kalman filter approach). The choice of baseline methods enables a diverse comparison.

Assessing Significance of Error Differences Statistically:

The system of the present disclosure conducted a Z-test based significance assessment (across all relevant experiments) under MAPE/MAE differences (EDB vs EDU/Baseline) with a significance level of 0.1 for null hypothesis rejection. In all experiments, the mean error metric was calculated by averaging more than 30 samples and hence a Z-test is sufficient. Overall, the system of the present disclosure observed that improvements of EDB (over EDU/baselines) are mostly significant, while instances where a baseline performs better than both EDB and EDU are very few.

Model Building Details:

Recall that FIG. 4 takes current position (m) also as input and builds a unified model. One issue with the unified model is that the section number has to be one-hot encoded with a large number of binary inputs (equal to the number of sections). Also, empirically building separate models for each m performs better. A possible intuitive explanation could be that the unified model has to generalize across all m while also handling a huge variation in encoder/decoder unfolded lengths for different m. Hence, separate models were built by the system of the present disclosure for each m based on FIG. 4.

For the purposes of the present disclosure and ease of demonstration, models were built uniformly spaced across the route, starting from section m=5 till section m=30 in steps of 5. For each of these bus positions, the travel time data is suitably grouped into input-output pairs in line with the input-output structure of FIG. 4 before training.

Figure 6A:
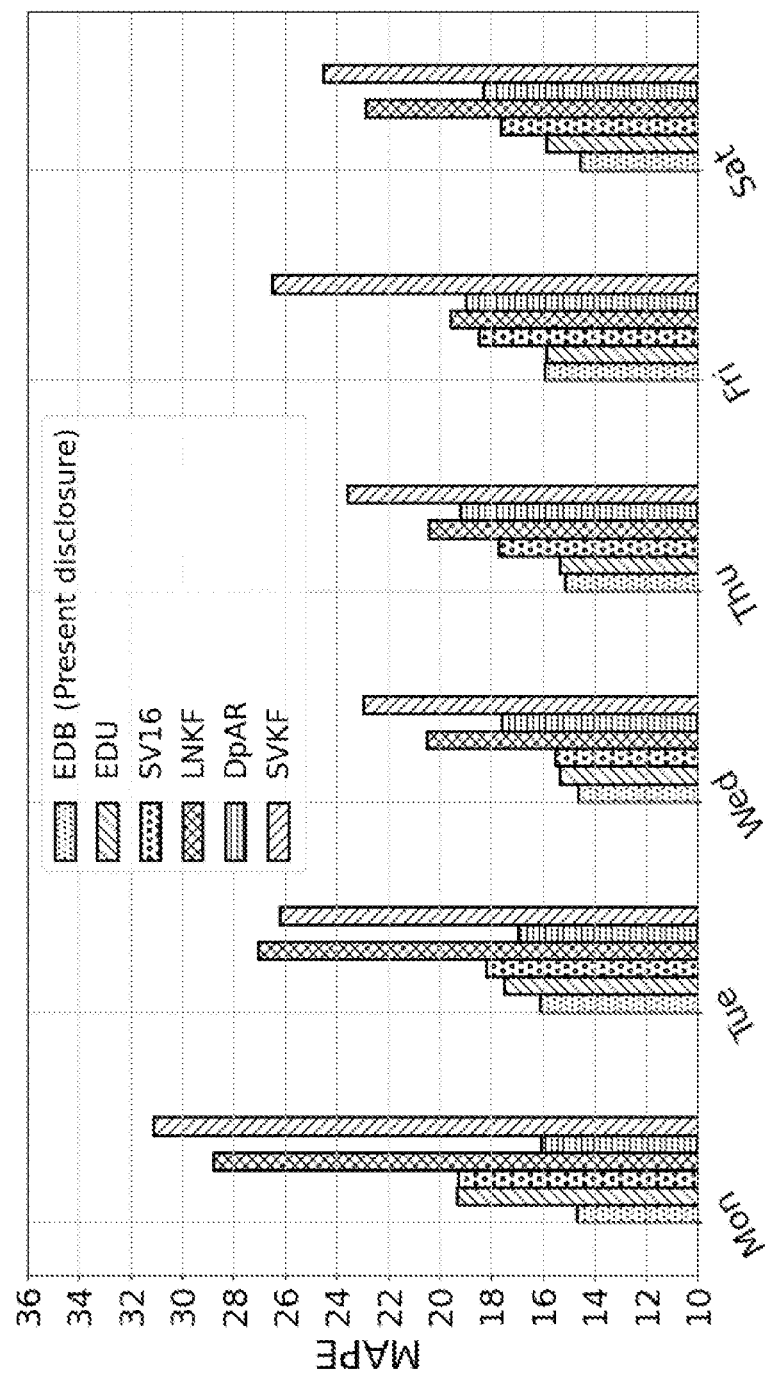
FIG. 6A depicts a graphical representation illustrating Mean Absolute Percentage Error (MAPE) for the method and conventional approaches respectively, in accordance with an embodiment of the present disclosure.
Figure 6B:
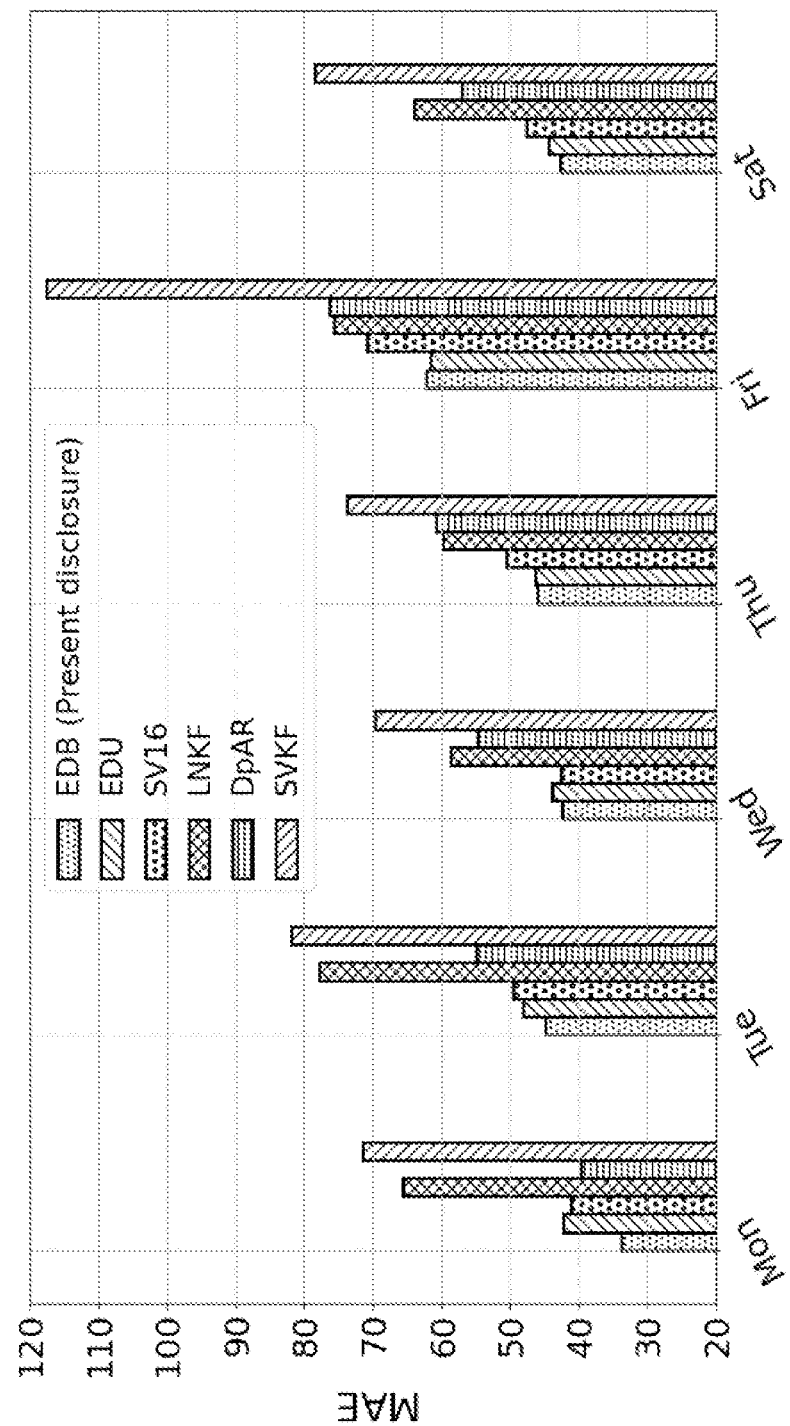
FIG. 6B depicts a graphical representation illustrating Mean Absolute Error (MAE) for the method and conventional approaches respectively, in accordance with an embodiment of the present disclosure.

Two-Step (Section) Ahead Prediction (Short Routes) Day Level Comparison:

The present disclosure compared two-step ahead predictions (for short routes) of EDU and EDB as implemented herein by the system 100 and the method of FIG. 2 with all existing methods at a day level. FIGS. 6A and 6B illustrate that the methods EDU and EDB consistently outperform existing methods at a 2-step level. Overall EDB (with the bidirectional layer at the decoder of the system 100) seems to perform the best. FIGS. 6A and 6B provide the comparisons in terms of MAPE and MAE respectively. More specifically, FIG. 6A, with reference to FIGS. 1 through 5, depicts a graphical representation illustrating Mean Absolute Percentage Error (MAPE) for the method and conventional approaches respectively, in accordance with an embodiment of the present disclosure. FIG. 6B, with reference to FIGS. 1 through 6A, depicts a graphical representation illustrating Mean Absolute Error (MAE) for the method and conventional approaches respectively, in accordance with an embodiment of the present disclosure. In particular, EDB performed the best with an advantage up to 4.04%, 4.59%, 14.08%, 16.41% and 4.64% over DpAR, SV16, LNKF, SVKF and EDU approaches respectively. Similarly, in terms of MAE, EDB performed the best with an advantage up to 14.76 s, 8.6 s, 32.96 s, 55.36 s and 8.33 s over DpAR, SV16, LNKF, SVKF and EDU approaches respectively. Overall, we observe reasonable improvements from our method based on both metrics.

Figure 7:
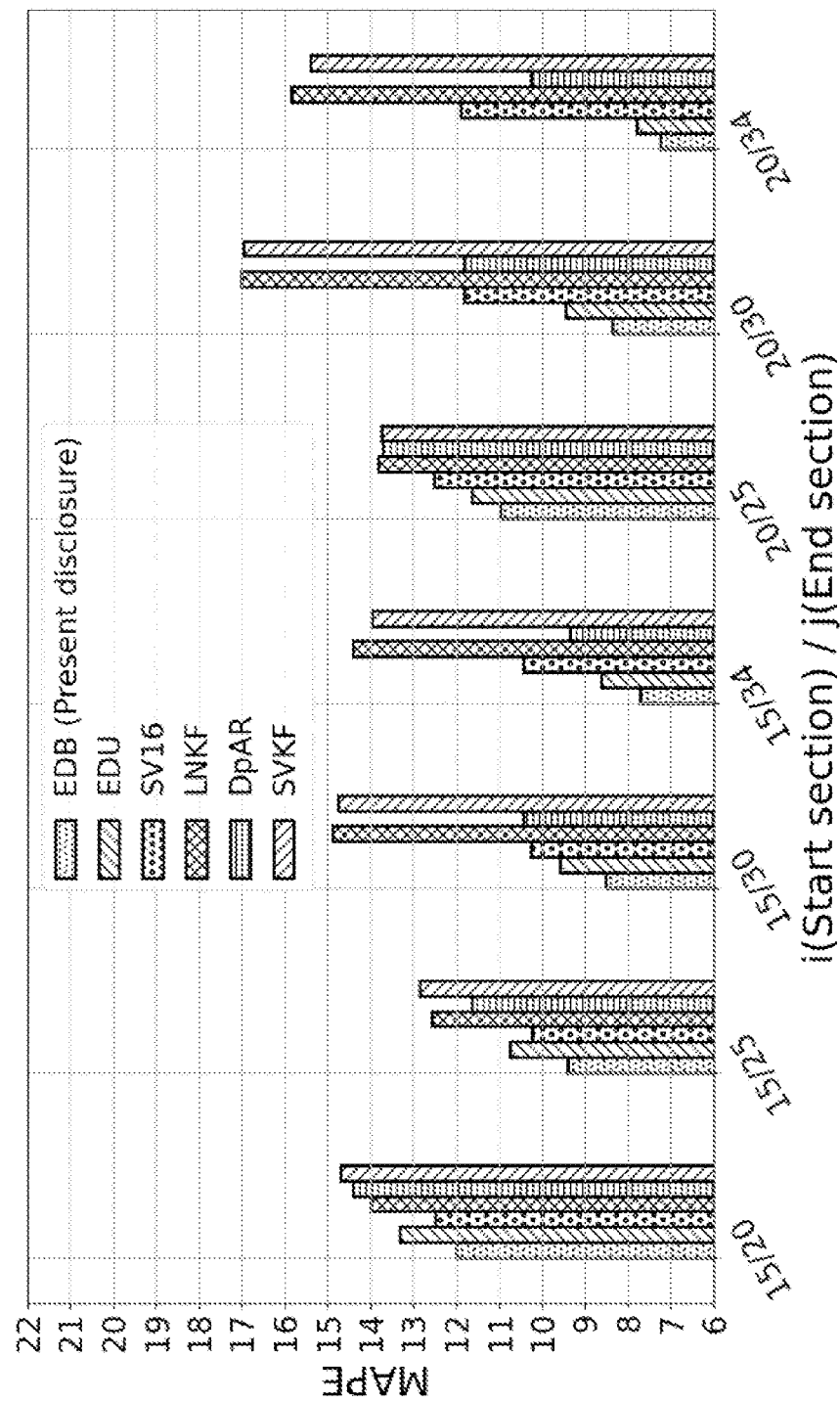
FIG. 7 depicts a graphical representation illustrating Multi-Step Ahead MAPE at specific start/current vehicle positions (again chosen in steps of 5) along the route, in accordance with an embodiment of the present disclosure.

Multi-Step Prediction:

The system of the present disclosure tested the learnt models on longer sub-routes. This is important as real-time prediction needs to be carried out between any two bus-stops (or sections) of the bus route. The system of the present disclosure evaluated performance based on both metrics. More specifically, FIG. 7, with reference to FIGS. 1 through 6B, depicts a graphical representation illustrating Multi-Step Ahead MAPE at specific start/current vehicle positions (again chosen in steps of 5) along the route, in accordance with an embodiment of the present disclosure. FIG. 7 shows comparison of MAPE values for an (i, j) pair, where i is the current bus position and j is the destination section.

Figure 8:
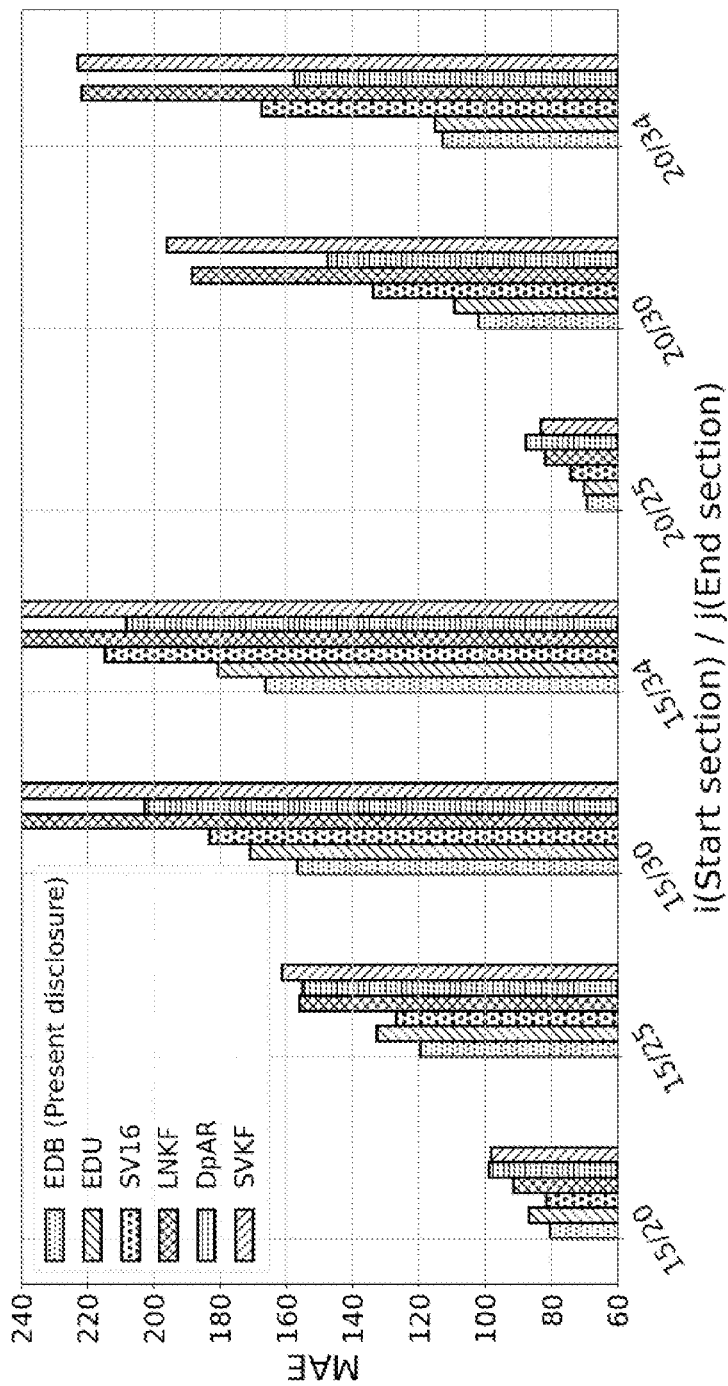
FIG. 8 depicts a graphical representation illustrating a Multi-Step Ahead MAE at specific start/current vehicle positions (again chosen in steps of 5) along the route, in accordance with an embodiment of the present disclosure.

This means for a given i∈{5, 10, 15, 20, 25, 30}, j is varied in steps of 5 from i+5. The only exception here is for the maximum j which is 34 (as the route ends there). FIG. 7 provides results for i=15, 20. MAE/MAPE is calculated by averaging across all trips and days in the test set by keeping the start section and end section fixed. It is noted that the EDU and EDB as implemented herein mostly perform better than DpAR, SV16, LNKF and SVKF based on both metrics (FIG. 7 and FIG. 8). FIG. 8, with reference to FIGS. 1 through 7, depicts a graphical representation illustrating a Multi-Step Ahead MAE at specific start/current vehicle positions (again chosen in steps of 5) along the route, in accordance with an embodiment of the present disclosure. EDB in particular, as in the 2-step case performed the best. Specifically, for a ahead prediction, EDB achieves MAPE improvement by up to 8.94%, 4.25%, 14.32%, 14.74% and 1.58% over DpAR, SV16, LNKF, SVKF and EDU respectively. For a 10-step ahead prediction, EDU reduced MAPE by up to 9.82%, 3.46%, 11.18%, 10.99% and 1.34% in comparison to DpAR, SV16, LNKF, SVKF and EDU respectively. For a 15-step ahead prediction, EDU reduced MAPE by up to 4.82%, 2.2%, 8.87%, 8.81% and 1.33% in comparison over DpAR, SV16, LNKF, SVKF and EDU respectively.

FIG. 8 provides results for i=15, 20. It was observed from FIG. 8 how the MAE generally increased with the length of the sub-route (i.e., (j—i)) inline with the intuition that error increases with prediction horizon. As before, EDB performance has been the best. Specifically, for a 5-step ahead prediction, EDB achieved MAE improvement by up to 45.96 s, 19.9 s, 102.82 s, 118.97 s and 6.19 s over DpAR, SV16, LNKF, SVKF and EDU respectively. For a 10-step ahead prediction, EDU reduced MAPE by up to 111.75 s, 31.82 s, 134.51 s, 145.16 s and 12.98 s in comparison over DpAR, SV16, LNKF, SVKF and EDU respectively. For a 15-step ahead prediction, EDU reduced MAPE by up to 80.15 s, 30.27 s, 158.8 s, 169.2 s and 16.33 s in comparison over DpAR, SV16, LNKF, SVKF and EDU respectively.

In the plots whenever some of the baselines have high errors, the system of the present disclosure avoided showing the associated bar heights completely as this adversely affects the visual comparison of the bars in the error range of our proposed approaches EDB and EDU. As a result, some clipped bars with actual error values higher than the max y-axis range have been shown.

The present disclosure provides system implement an Encoder Decoder (Seq2Seq) RNN based approach/method (e.g., refer FIG. 2 and also referred as ED prediction framework and interchangeably used herein) for Bus arrival time prediction (BATP). As shown, the ED prediction framework had a natural fit to simultaneously predict travel times across subsequent sections of the currently plying bus. The real-time spatio-temporal correlations and weekly seasonal influences were also incorporated into the predictive model implemented by the present disclosure. Further, the system and method use a bidirectional layer at the decoder to capture the potential downstream congestion influences for superior predictions. This feature of the bidirectional layer at the decoder seems unexplored in other time-series based applications of the ED framework. The ED framework with the bidirectional decoder can potentially have applications in sales prediction for retail for instance. If promo information/prices are fed as inputs as decoder inputs, then future promos can potentially influence past sales. This anti-causal influence can rightly be captured by the ED framework with some modifications as per the requirement). In that sense, the ED framework/method described herein is general and can be employed in other application domains as well. The system demonstrated via detailed experiments the utility of the method of the present disclosure on a bus route from challenging mixed traffic conditions. Results indicate that the method of the present disclosure performs better than many state-of-art approaches for the same problem.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
    obtaining, via one or more hardware processors, a route information pertaining to one or more trips associated to one or more vehicles;
    segmenting, via the one or more hardware processors, the route information into a plurality of sections, wherein each of the plurality of sections comprises travel time of the one or more trips, and wherein the travel time comprises running time and dwell time;
    grouping, via the one or more hardware processors, for each trip (i) travel time of one or more previous sections with reference to a current section from the plurality of sections, and (ii) travel time of one or more previous sections of a historical trip from a previous week, to obtain a grouped trip data;
    generating, via an encoder comprised in an encoder-decoder model, a context vector using the grouped trip data, wherein the encoder-decoder model further comprises a decoder and one or more bidirectional layers at the decoder;
    predicting, by the decoder via the one or more hardware processors, a travel time for one or more subsequent sections, for one or more trips based on one or more exogenous inputs further comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the predicted travel time of the one or more subsequent sections; and
    capturing, via the decoder comprised in an encoder-decoder model, an upstream propagation of one or more congestions that originate downstream in the one or more subsequent sections,
    wherein the bidirectional layers at the decoder, capture, for a given section, influence of past congestions in time across the one or more subsequent sections propagating backward in space,
    wherein in a bi-directional setting, an additional state-vector $\vec{h}_{\tilde{t}}$ is available and $f_2$ is mapped, with an update $\vec{h}_{\tilde{t}} = f_2(\vec{h}_{\tilde{t}+1}, u_t)$ with reverse information flow, a state at time-step i, $h_i$, is a concatenation $[\vec{h}_{\tilde{t}}, \vec{h}_{\tilde{t}}]$, a state-update $\vec{h}_{\tilde{t}} = f_1(\vec{h}_{\tilde{t}-1}, u_t)$ happens for each timestep with a state information flowing from left to right.

2. The processor implemented method of claim 1, wherein the travel times for the subsequent sections of the closest previous trip serve as one or more real time recent congestion indicators.

3. The processor implemented method of claim 1, wherein the travel time of a previous section with reference to a current section, specific to one or more trips, constitute spatial correlations.

4. The processor implemented method of claim 1, wherein travel times across the plurality of subsequent sections corresponding to the current trip and the closest previous trip constitutes temporal correlations.

5. The processor implemented method of claim 1, wherein the travel time of previous week trip constitutes weekly seasonal correlations, and wherein the previous week trip is determined based on a minimum difference in the travel times of historical trips from the same weekday and a current trip.

6. A system, comprising:
a memory storing instructions;
one or more communication interfaces; and
one or more hardware processors coupled to the memory via the one or more communication interfaces, wherein the one or more hardware processors are configured by the instructions to:
obtain a route information pertaining to one or more trips associated to one or more vehicles;
segment the route information into a plurality of sections, wherein each of the plurality of sections comprises travel time of the one or more trips, and wherein the travel time comprises running time and dwell time;
group for each trip (i) travel time of one or more previous sections with reference to a current section from the plurality of sections, and (ii) travel time of one or more previous sections of a historical trip from a previous week, to obtain a grouped trip data;
generate, via an encoder comprised in an encoder-decoder model, a context vector using the grouped trip data, wherein the encoder-decoder model further comprises a decoder and one or more bidirectional layers at the decoder;
predict, by the decoder, a travel time for one or more subsequent sections, for one or more trips based on one or more exogenous inputs further comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the predicted travel time of the one or more subsequent sections; and
capture, via the decoder comprised in an encoder-decoder model, an upstream propagation of one or more congestions that originate downstream in the one or more subsequent sections,
wherein the bidirectional layers at the decoder, capture, for a given section, influence of past congestions in time across the one or more subsequent sections propagating backward in space,
wherein in a bi-directional setting, an additional state-vector $\vec{h}_{\overleftarrow{i}}$ is available and $f_2$ is mapped, with an update $\vec{h}_{\overleftarrow{i}} = f_2(\vec{h}_{\overleftarrow{i}+1}, u_t)$ with reverse information flow, a state at time-step i, $h_i$, is a concatenation $[\vec{h}_{\overleftarrow{i}}, \vec{h}_{\overleftarrow{i}}]$, astate-update $\overrightarrow{h}_{\overrightarrow{i}} = f_1(\overrightarrow{h}_{\overrightarrow{i}-1}, u_t)$ happens for each timestep with a state information flowing from left to right.

7. The system of claim 6, wherein the travel times for the subsequent sections of the closest previous trip serve as one or more real time recent congestion indicators.

8. The system of claim 6, wherein the travel time of a previous section with reference to a current section, specific to one or more trips, constitute spatial correlations.

9. The system of claim 6, wherein travel times across the plurality of subsequent sections corresponding to the current trip and the closest previous trip constitutes temporal correlations.

10. The system of claim 6, wherein the travel time of previous week trip constitutes weekly seasonal correlations, and wherein the previous week trip is determined based on a minimum difference in the travel times of historical trips from the same weekday and a current trip.

11. One or more non-transitory machine-readable information storage mediums comprising one or more instructions which when executed by one or more hardware processors cause:
obtaining a route information pertaining to one or more trips associated to one or more vehicles;
segmenting the route information into a plurality of sections, wherein each of the plurality of sections comprises travel time of the one or more trips, and wherein the travel time comprises running time and dwell time;
grouping for each trip (i) travel time of one or more previous sections with reference to a current section from the plurality of sections, and (ii) travel time of one or more previous sections of a historical trip from a previous week, to obtain a grouped trip data;
generating, via an encoder comprised in an encoder-decoder model, a context vector using the grouped trip data, wherein the encoder-decoder model further comprises a decoder and one or more bidirectional layers at the decoder;
predicting, by the decoder, a travel time for one or more subsequent sections, for one or more trips based on one or more exogenous inputs further comprising (i) travel time and entry time of the historical trip from the previous week, (ii) travel time and entry time of a closest previous trip, (iii) the context vector, (iv) a current position of one or more vehicles, and (v) the current time, wherein a final arrival time is obtained based on the predicted travel time of the one or more subsequent sections; and
capturing, via the decoder comprised in an encoder-decoder model, an upstream propagation of one or more congestions that originate downstream in the one or more subsequent sections,
wherein the bidirectional layers at the decoder, capture, for a given section, influence of past congestions in time across the one or more subsequent sections propagating backward in space,
wherein in a bi-directional setting, an additional state-vector $\vec{h}_{\overleftarrow{i}}$ is available and $f_2$ is mapped, with an update $\vec{h}_{\overleftarrow{i}} = f_2(\vec{h}_{\overleftarrow{i}+1}, u_t)$ with reverse information flow, a state at time-step i, $h_i$, is a concatenation $[\vec{h}_{\overleftarrow{i}}, \vec{h}_{\overleftarrow{i}}]$, a state-update $\overrightarrow{h}_{\overrightarrow{i}} = f_1(\overrightarrow{h}_{\overrightarrow{i}-1}, u_t)$ happens for each timestep with a state information flowing from left to right.

12. The one or more non-transitory machine-readable information storage mediums of claim 11, wherein the travel times for the subsequent sections of the closest previous trip serve as one or more real time recent congestion indicators.

13. The one or more non-transitory machine-readable information storage mediums of claim 11, wherein the travel time of a previous section with reference to a current section, specific to one or more trips, constitute spatial correlations.

14. The one or more non-transitory machine-readable information storage mediums of claim 11, wherein travel times across the plurality of subsequent sections corresponding to the current trip and the closest previous trip constitutes temporal correlations.

15. The one or more non-transitory machine-readable information storage mediums of claim 11, wherein the travel time of previous week trip constitutes weekly seasonal correlations, and wherein the previous week trip is determined based on a minimum difference in the travel times of historical trips from the same weekday and a current trip.

* * * * *